US009103215B2

United States Patent
Fromentin et al.

(10) Patent No.: US 9,103,215 B2
(45) Date of Patent: Aug. 11, 2015

(54) METHOD OF PRODUCING A GUIDE VANE

(75) Inventors: Jean-Francois Fromentin, Cesson la Foret (FR); Jean-Baptiste Mottin, Poitiers (FR)

(73) Assignee: SNECMA, Paris (FR)

( * ) Notice: Subject to any disclaimer, the term of this patent is extended or adjusted under 35 U.S.C. 154(b) by 792 days.

(21) Appl. No.: 13/368,671

(22) Filed: Feb. 8, 2012

(65) Prior Publication Data
US 2012/0201686 A1 Aug. 9, 2012

(30) Foreign Application Priority Data

Feb. 9, 2011 (FR) ...................................... 11 51049

(51) Int. Cl.
*F01D 5/14* (2006.01)
*B22F 3/105* (2006.01)
*B22F 5/04* (2006.01)
*B22F 7/06* (2006.01)
*B22F 5/00* (2006.01)

(52) U.S. Cl.
CPC .............. *F01D 5/147* (2013.01); *B22F 3/1055* (2013.01); *B22F 5/04* (2013.01); *B22F 7/06* (2013.01); *B22F 5/009* (2013.01); *F05D 2230/30* (2013.01); *F05D 2240/12* (2013.01); *F05D 2300/43* (2013.01); *Y02T 50/671* (2013.01); *Y02T 50/673* (2013.01); *Y10T 29/49336* (2015.01)

(58) Field of Classification Search
CPC .................................. F01D 5/147; F01D 5/148
See application file for complete search history.

(56) References Cited

U.S. PATENT DOCUMENTS

| 5,295,789 | A * | 3/1994 | Daguet .................... 416/241 A |
| 6,269,540 | B1 * | 8/2001 | Islam et al. ................... 29/889.7 |
| 7,988,412 | B2 * | 8/2011 | Hardwicke et al. ............... 416/1 |
| 2003/0175122 | A1 * | 9/2003 | Zhao et al. ................ 416/241 B |
| 2003/0222122 | A1 * | 12/2003 | Johnson et al. ............... 228/101 |
| 2004/0200887 | A1 | 10/2004 | Franchet et al. |
| 2006/0054079 | A1 * | 3/2006 | Withey et al. ................ 117/108 |
| 2007/0065291 | A1 | 3/2007 | Karafillis |
| 2007/0243069 | A1 | 10/2007 | Read |
| 2007/0286760 | A1 | 12/2007 | Thompson |
| 2008/0135530 | A1 * | 6/2008 | Lee et al. ................. 219/121.64 |
| 2008/0290215 | A1 | 11/2008 | Udall et al. |
| 2008/0295518 | A1 * | 12/2008 | Reba et al. ...................... 60/725 |
| 2009/0028697 | A1 | 1/2009 | Shi et al. |

(Continued)

FOREIGN PATENT DOCUMENTS

| EP | 1 466 692 A1 | 10/2004 |
| EP | 1 844 885 A1 | 10/2007 |

(Continued)

OTHER PUBLICATIONS

French Preliminary Search Report issued Sep. 16, 2011, in French 1151049, filed Feb. 9, 2011 (with English Translation of Categories of Cited Documents).

*Primary Examiner* — Nathaniel Wiehe
*Assistant Examiner* — Ryan C Clark
(74) *Attorney, Agent, or Firm* — Oblon, McClelland, Maier & Neustadt, L.L.P.

(57) ABSTRACT

The invention relates to a method of producing a guide vane, the method comprising a step of fabricating at least a portion of a metal body of the guide vane by additive fabrication, with at least one outside surface thereof presenting a plurality of cavities; and a step of filling said cavities with a material of lower density than the metal body in order to form at least one substantially smooth airfoil surface.

16 Claims, 2 Drawing Sheets

(56) References Cited

U.S. PATENT DOCUMENTS

| | | | |
|---|---|---|---|
| 2010/0028133 A1* | 2/2010 | Delvaux et al. | 415/119 |
| 2011/0162374 A1* | 7/2011 | Delvaux et al. | 60/740 |
| 2014/0271161 A1* | 9/2014 | Lazur | 415/200 |

FOREIGN PATENT DOCUMENTS

| | | | |
|---|---|---|---|
| EP | 2 025 777 A2 | | 2/2009 |
| GB | 2106995 A | * | 4/1983 |
| GB | 2 418 459 | | 3/2006 |

* cited by examiner

METHOD OF PRODUCING A GUIDE VANE

FIELD OF THE INVENTION

The present invention relates to a method of producing a guide vane.

BACKGROUND OF THE INVENTION

In mechanical engineering, and most particularly in the field of aviation, it is often important to reduce the weight of parts, while maintaining satisfactory mechanical properties. By way of example, this is particularly important for the fan guide vanes of a turbofan engine, given that their dimensions can be as large as can the forces to which they are subjected. A turbofan engine has a fan that is normally situated at the front of the engine. It then delivers a stream of air that is split into a primary stream and an annular secondary stream around the primary stream. The primary stream is guided to a compressor, a combustion chamber, a turbine that drives the compressor and the fan, and is ejected together with the combustion gas via an exhaust nozzle in order to produce reaction thrust. The flow direction of the secondary stream is guided downstream from the fan, and the stream is ejected in substantially the same direction. Thus, thrust is due not only to the primary stream with the hot combustion gases, but also to the secondary stream of cool air driven by the fan.

The outlet guide vanes (OGV) of the fan are normally 30 to 50 in number and they have two functions in turbofan engines: structurally they form a connection between the fan casing and the remainder of the engine, and aerodynamically they straighten out the stream downstream from the rotary blades of the fan, thereby improving the thrust efficiency of the fan.

The term "bypass ratio" designates the ratio of the mass flow rate of cool air from the fan to the mass flow rate of hot combustion gas from the nozzle. Except at very high speeds, in particular supersonic speeds, the thrust efficiency of a turbofan engine increases with said bypass ratio. Increasing the bypass ratio thus constitutes an appropriate technique for reducing the energy consumption of turbofan engines, and consequently for reducing both operating costs and emissions of polluting and greenhouse effect gases. A high bypass ratio also presents other advantages, such as a lower sound impact.

Nevertheless, in order to increase the bypass ratio, it is normally necessary also to increase the diameter of the fan. However that presents several drawbacks, including in particular increasing both the size of the guide vanes and the forces to which they are subjected.

In the prior art, proposals have been made to limit the weight of fan guide vanes in various different ways, such as, for example: mechanically assembling guide vanes from a plurality of parts to form a hollow structure, or else forming a cavity in the vane by means of an insert that is dissolved away chemically. Nevertheless, those methods present drawbacks. Mechanically assembling a vane is lengthy and requires labor. In addition, it can give rise to unwanted deformations and stresses in the vane. Chemically dissolving an insert produces pollution and is therefore problematic from an environmental point of view.

In published patent application US 2007/065291 A1, proposals are made to produce rotary blades comprising a metal body that is machined with cavities that are filled with a material of lower density in order to reduce their weight. Nevertheless, machining such cavities is made increasingly expensive as their shape becomes more complex, thereby reducing the potential for reducing the weight of blades while maintaining mechanical qualities that are substantially uniform.

OBJECT AND SUMMARY OF THE INVENTION

The invention seeks to propose a method of producing guide vanes that enables the weight of such guide vanes to be reduced significantly, while conserving good mechanical properties, and to do so in a manner that is comparatively simple, without the environmental constraints associated with chemically dissolving an insert.

In at least one implementation of a method of the invention for producing guide vanes, the method comprises at least a step of fabricating at least a portion of a metal body of the guide vane by additive fabrication, with at least one outside surface thereof presenting a plurality of cavities, and a step of filling said cavities with a material of lower density than the metal body in order to form at least one substantially smooth airfoil surface.

The term "additive fabrication" is used in the context of the present invention to cover all fabrication methods, also known as "rapid prototyping" or "rapid fabrication", that involves adding successive layers of material in order to produce a three-dimensional structure. By using additive fabrication to make the metal body of the vane, it is possible to give its cavities structures that are particularly fine and complex in three dimensions, while nevertheless being stable and substantial. This thus makes it possible to obtain a reduction in weight that is greater than can be obtained by other production methods.

Even if additive fabrication may present the drawback of creating a metal body with mechanical qualities that are inferior, in particular in terms of tension, to the qualities of a bulk-machined metal body, this drawback is less important in its application to guide vanes, since they are not subjected to the large centrifugal forces to which rotary blades are subjected.

The additive fabrication method may be a method of selectively melting a metal powder, thus making it possible to make complex three-dimensional structures directly out of metal.

Said powder may be selectively melted by an electron beam and/or by laser, thus making it possible to make three-dimensional structures that are very fine. For the method of the invention, laser melting is particularly advantageous because of its greater accuracy.

Each of said cavities may be a cell with a depth having an order of magnitude that is equal to or greater than a maximum width of the cell, thus making it possible to obtain better adhesion with the material filling the cavities.

Said metal body may comprise a cellular core and at least one solid peripheral element, which may in particular include a leading edge, a trailing edge, and at least one connection platform of the vane. The periphery of the metal body that is normally subjected to the greatest mechanical stresses and to any impacts is thus reinforced, while the remaining mechanical forces are thus distributed throughout the cellular core, thereby obtaining mechanical qualities that are particularly good, while also limiting the weight of the guide vane.

Said solid peripheral element and said cellular core may be integrally formed as a single piece by additive fabrication, thus taking advantage of the flexibility of additive fabrication methods for reducing the number of production steps.

In order to better optimize the distribution of the material of the metal body, said metal body, and in particular a said cellular core, may include a plurality of zones having different cell densities.

At least one of said cavities may pass through from a suction side to a pressure side of the vane, with an even greater reduction in weight.

Said material of lower density may be a synthetic material, in particular being introduced into said cavities in the liquid state, e.g. by injection, and subsequently hardened, thus making it possible to obtain an airfoil surface that is particularly smooth with good penetration and good adhesion in said cavities.

The present invention also provides a guide vane obtained by such a fabrication method.

Such a guide vane is particularly advantageous as a fan guide vane for a turbofan engine, because of the large dimensions that are required.

The invention also provides such a fan and such a turbofan engine, and also an aircraft including such a turbofan engine.

BRIEF DESCRIPTION OF THE DRAWINGS

The invention can be well understood and its advantages appear better on reading the following detailed description of embodiments shown as non-limiting examples. The description refers to the accompanying drawings, in which.

MORE DETAILED DESCRIPTION

Figure 1:
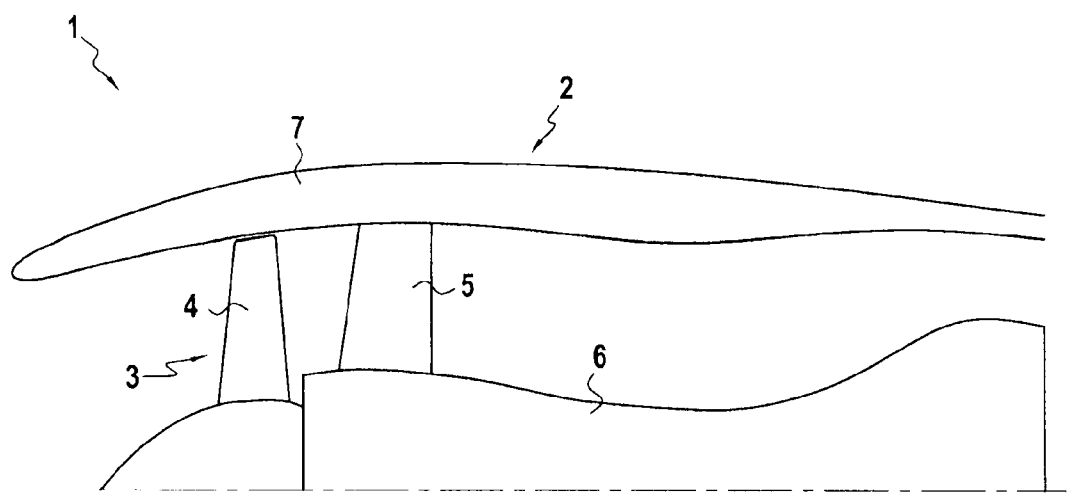
FIG. 1 is an overall view of a turbofan engine.

A turbofan engine 1 is shown in FIG. 1. The turbofan engine 1 comprises a fan 2 with a rotor 3 having rotary blades 4 driven by a turbine stage (not shown) of the engine 1, and outlet guide vanes 5 downstream from the rotary blades 4. In addition to guiding the flow of air downstream from the rotary blades 4, the guide vanes 5 also serve to connect the core 6 of the engine to the fan casing 7. They are therefore subjected to high levels of mechanical force, both continuous forces and vibratory forces, in tension, pressure, bending, and twisting. Nevertheless, because of their considerable dimensions, the use of solid vanes would increase the weight of the engine 1 in undesirable manner.

Figure 2:
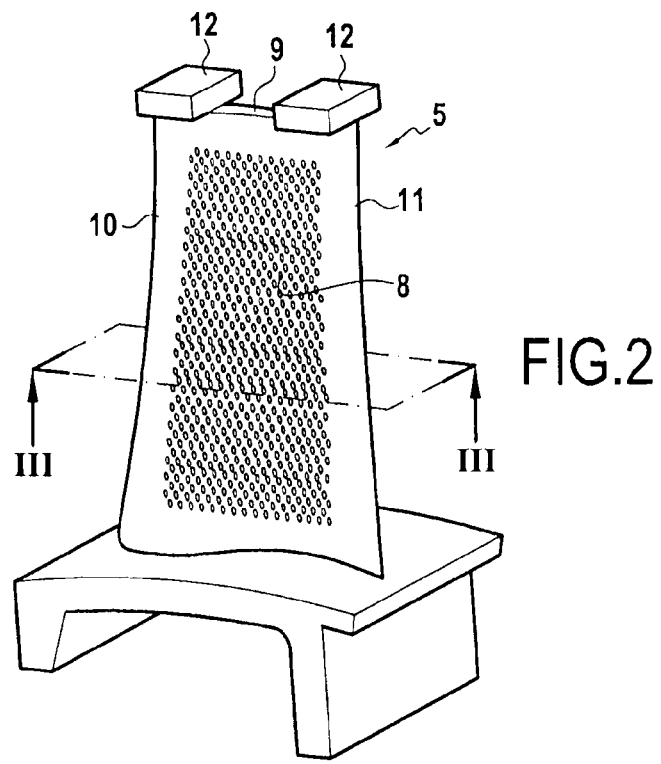
FIG. 2 is a diagrammatic view of a fan guide vane in a first embodiment of the invention.

A fan guide vane 5 in a first embodiment of the invention is shown in FIG. 2. This guide vane 5 comprises a metal body 13 having a cellular core 8, and a solid frame 9 including the leading edge 10, the trailing edge 11, and the fastener platforms 12 of the guide vane 5. Cells in the cellular core 8 form cavities that are open to the suction side and/or to the pressure side of the vane 5, and they are filled with synthetic material so as to make a suction side and a pressure side that are substantially smooth.

Figure 3:
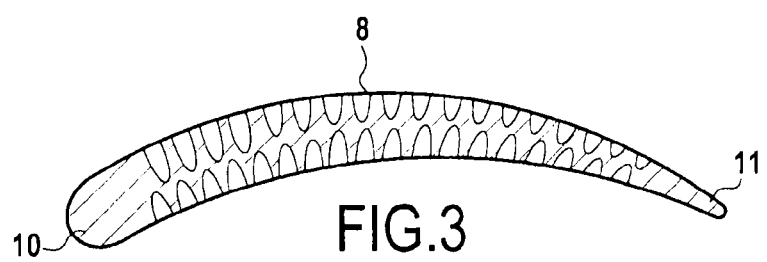
FIG. 3 is a cross-section of the FIG. 2 vane on line III-III.
Figure 4:
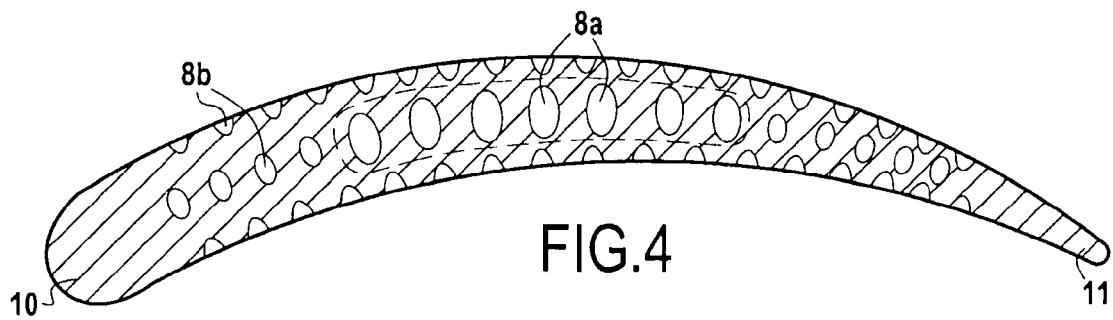
FIG. 4 is a cross-section of a fan guide vane in a second embodiment of the invention.

FIG. 3 is a cross-section of the FIG. 2 guide vane 5, showing the core 8 between the leading and trailing edges 10 and 11 of the frame 9. In this first embodiment, the core 8 is of substantially constant density. Nevertheless, in a second embodiment shown in FIG. 4, the core 8 has a first zone 8a of lower density and a second zone 8b around the first zone 8a that is of higher density. It is thus possible to optimize the distribution of metal within the core 8 in order to adapt it to the specific stresses to which the guide vane 5 will be subjected.

Figure 5A:
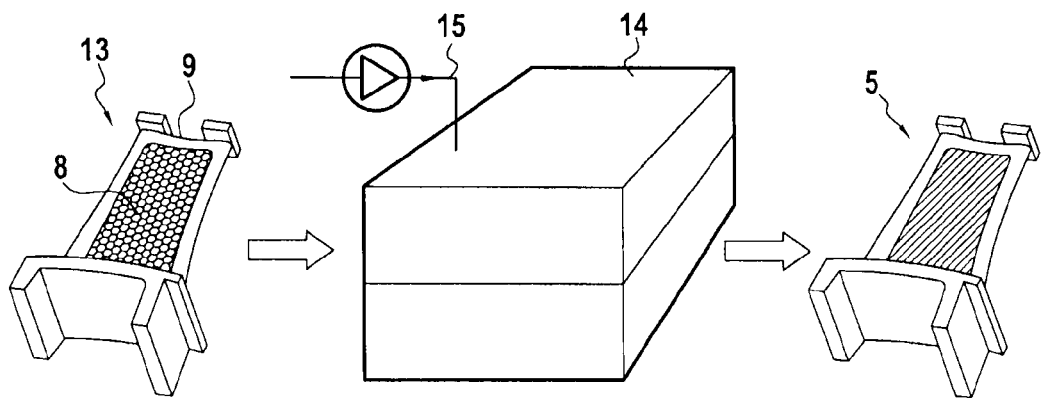
FIG. 5A shows a method of producing a guide vane in either of said first or second embodiments.

In one method of producing guide vanes in either of these two embodiments, and as shown in FIG. 5A, the metal body 13 of a guide vane 5 of either of the above-described embodiments is produced as a single piece by an additive fabrication method, such as a method of electron beam melting, of selective laser sintering, and/or of laser spraying. Thereafter, the metal body 13 is inserted into a mold 14 into which a liquid synthetic material 15 is injected so as to fill, at least in part, the cavities in the metal body 13 that open out into the suction side and/or the pressure side of the vane, thereby obtaining airfoil surfaces that are substantially smooth. After the synthetic material 15 has hardened, the resulting vane 5 can be unmolded.

By way of example, the metal body 13 may be made of aluminum, titanium, or an alloy thereof. The synthetic material may be a thermoplastic or thermosetting polymer synthetic material, preferably of light weight, such as a synthetic foam, for example. In particular, among the materials which may be used, are epoxy resins, such as those used in RTM processes, and dampening resin of foam. It may also be loaded with solid particles or short fibers, although not to the extent to increase its density above that of the metal body. In particular, the solid particles or short fibers may normally be of a less dense material than the metal body themselves.

Figure 5B:
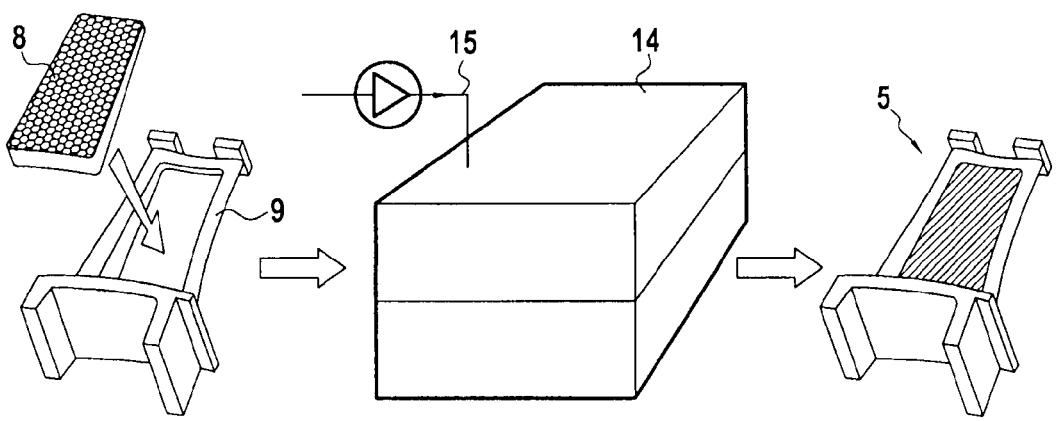
FIG. 5B shows a method of producing a guide vane in a third embodiment.

A method of fabricating a third embodiment of a guide vane is shown in FIG. 5B. In this guide vane 5, the metal body 13 comprises a solid frame 9 with an opening between the suction side and pressure side of the vane 5, and with a cellular core 8 that is received in said opening in the frame 9 and connected thereto by conventional means such as adhesive, brazing, and/or welding. The cells in the cellular core 8 that pass through the metal body of the vane 5 from the suction side to the pressure side are filled with synthetic material in order to make a suction side and a pressure side that are substantially smooth.

It is possible in this third embodiment to use the same materials as are used in the first and second embodiments. Nevertheless, the third embodiment presents the advantage of it being possible to use dissimilar materials for the frame 9 and the core 8.

In the fabrication method shown in FIG. 5B, the cellular metal core 8 is produced separately from the solid frame 9 by an additive fabrication method. The frame 9 may itself be produced as a single piece, or it may be the result of assembling a plurality of different parts together. The core 8 and the frame 9 are subsequently joined together by adhesive, welding, and/or brazing, and the resulting assembly 13 is inserted into the mold 8 for injecting and hardening the synthetic material 15, as in the method shown in FIG. 5A. The resulting vane 5 may then be unmolded.

Although the present invention is described above with reference to specific embodiments, it is clear that various modifications and changes may be performed on those embodiments without going beyond the general ambit of the invention as defined by the claims. In particular, individual characteristics of the various embodiments shown may be combined in additional embodiments. Consequently, the description and the drawings should be considered as being illustrative rather than restrictive.

What is claimed is:

1. A production method of producing a guide vane, the method comprising:

fabricating at least a portion of a metal body of the guide vane by additive fabrication, the metal body including a metal frame surrounding a cellular core including at least one outside surface presenting a plurality of cavities opening to at least one of a suction side or a pressure side of the guide vane;

placing the metal body in a mold;

filling said cavities with a synthetic material of lower density than the metal body in order to form at least one substantially smooth airfoil surface on at least one of the suction side or the pressure side of the guide vane; and removing the metal body from the mold after the synthetic material has hardened.

2. A production method according to claim 1, wherein the additive fabrication method is a method of selectively melting a metal powder.

3. A production method according to claim 2, wherein said powder is selectively melted by an electron beam and/or by laser.

4. A production method according to claim 1, wherein each of said cavities is a cell with a depth having an order of magnitude that is equal to or greater than a maximum width of the cell.

5. A production method according to claim 4, wherein said metal body comprises a cellular core and at least one solid peripheral element.

6. A production method according to claim 5, wherein said solid peripheral element comprises a leading edge, a trailing edge, and/or at least one connection platform of the vane.

7. A production method according to claim 6, wherein said solid peripheral element and said cellular core are formed integrally as a single piece by additive fabrication.

8. A production method according to claim 4, wherein said metal body comprises a plurality of zones having different cell densities.

9. A production method according to claim 1, wherein at least one of said cavities passes from a suction side to a pressure side of the vane.

10. A production method according to claim 1, wherein said material of lower density is a synthetic material.

11. A production method according to claim 10, wherein said synthetic material is introduced into said cavities in the liquid state and is subsequently hardened.

12. A production method according to claim 11, wherein said synthetic material is introduced into said cavities by injection.

13. A guide vane produced by the method according to claim 1.

14. A guide vane according to claim 13, wherein said guide vane is a fan guide vane of a fan of a turbofan engine.

15. A fan of a turbofan engine including a guide vane according to claim 13.

16. A turbofan engine including a fan according to claim 15.

* * * * *